United States Patent
Suzuki et al.

(10) Patent No.: US 11,152,696 B2
(45) Date of Patent: Oct. 19, 2021

(54) RADIO-WAVE TRANSPARENT COVER

(71) Applicant: TOYODA GOSEI CO., LTD., Kiyosu (JP)

(72) Inventors: Risa Suzuki, Kiyosu (JP); Hideto Maeda, Kiyosu (JP); Yuhki Maji, Kiyosu (JP); Kimihiro Iimura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/354,777

(22) Filed: Mar. 15, 2019

(65) Prior Publication Data

US 2019/0305412 A1    Oct. 3, 2019

(30) Foreign Application Priority Data

Mar. 29, 2018 (JP) .............................. JP2018-065643

(51) Int. Cl.
*H01Q 1/42* (2006.01)
*H01Q 1/32* (2006.01)
(Continued)

(52) U.S. Cl.
CPC ........... *H01Q 1/42* (2013.01); *B29C 45/1671* (2013.01); *H01Q 1/3233* (2013.01); *B29C 45/14811* (2013.01); *B29C 45/1657* (2013.01); *B29K 2995/0026* (2013.01); *B29K 2995/0029* (2013.01); *B29L 2031/3456* (2013.01)

(58) Field of Classification Search
CPC ...... H01Q 1/32; H01Q 1/3233; H01Q 1/3275; H01Q 1/42; H01Q 1/421; H01Q 1/422
See application file for complete search history.

(56) References Cited

U.S. PATENT DOCUMENTS 10,135,131 B2 * 11/2018 Takao ............... H01Q 1/42
2003/0128164 A1 * 7/2003 Rahaim ............. H01Q 1/405
343/700 MS
(Continued)

FOREIGN PATENT DOCUMENTS

JP    2009-018790 A    1/2009
JP    2016-124113 A    7/2016
(Continued)

OTHER PUBLICATIONS

Extended EP Search Report dated Jun. 26, 2019 issued in corresponding EP patent application No. 19165036.5.
(Continued)

*Primary Examiner* — Jason Crawford
(74) *Attorney, Agent, or Firm* — Posz Law Group, PLC

(57) ABSTRACT

The radio-wave transparent cover includes a plastic transparent layer, a decorative layer provided on the rear-side surface of the transparent layer, and a plastic base layer provided on the rear-side surface of the decorative layer. The transparent layer has a peripheral part having a protrusion extending rearward. The protrusion defines a peripheral edge of the transparent layer. The protrusion has an inner circumferential surface forming a part of an engaging end projecting rearward from the protrusion. The decorative layer is provided in a region of the rear-side surface of the transparent layer adjoining the inner circumferential surface of the engaging end.

7 Claims, 3 Drawing Sheets

(51) Int. Cl.
*B29C 45/16* (2006.01)
*B29L 31/34* (2006.01)
*B29C 45/14* (2006.01)

(56) References Cited

U.S. PATENT DOCUMENTS

| | | | | |
|---|---|---|---|---|
| 2004/0125023 A1* | 7/2004 | Fujii | H01Q 1/3291 | 343/700 MS |
| 2006/0262003 A1* | 11/2006 | Kamiya | B60R 13/04 | 342/5 |
| 2006/0284335 A1* | 12/2006 | Fujii | H01Q 1/3283 | 264/255 |
| 2007/0109206 A1* | 5/2007 | Fujii | H01Q 1/3233 | 343/711 |
| 2008/0233367 A1* | 9/2008 | Maeda | H01Q 1/3233 | 428/201 |
| 2008/0309579 A1* | 12/2008 | Maeda | H01Q 1/42 | 343/872 |
| 2010/0028610 A1* | 2/2010 | Fujii | H01Q 1/3233 | 428/164 |
| 2011/0088827 A1* | 4/2011 | Zanini | B60R 13/005 | 156/63 |
| 2012/0119961 A1* | 5/2012 | Mayer Pujadas | H01Q 1/38 | 343/713 |
| 2015/0086731 A1* | 3/2015 | Sugiura | B44C 1/1729 | 428/31 |
| 2016/0111776 A1* | 4/2016 | Okumura | H01Q 1/422 | 343/872 |
| 2017/0301982 A1 | 10/2017 | Ohtake et al. | | |
| 2017/0352938 A1* | 12/2017 | Okumura | B60S 1/66 | |
| 2018/0159207 A1* | 6/2018 | Shurish | H01Q 1/422 | |
| 2018/0162028 A1* | 6/2018 | Han | B60R 13/005 | |
| 2018/0207900 A1* | 7/2018 | Kosugi | H01Q 1/42 | |
| 2019/0036205 A1* | 1/2019 | Suzuki | H01Q 1/38 | |
| 2019/0111599 A1* | 4/2019 | Matsuo | B29C 45/1643 | |
| 2019/0190135 A1* | 6/2019 | Tokunaga | H01Q 1/42 | |
| 2019/0232886 A1* | 8/2019 | Okumura | H01Q 1/44 | |
| 2019/0293752 A1* | 9/2019 | Ochiai | B29C 45/16 | |
| 2019/0305410 A1* | 10/2019 | Tokunaga | H01Q 1/40 | |

FOREIGN PATENT DOCUMENTS

| | | |
|---|---|---|
| JP | 2016-141355 A | 8/2016 |
| JP | 2018-020587 A | 2/2018 |
| WO | 2018/025687 A1 | 2/2018 |
| WO | 2018/061250 A1 | 4/2018 |

OTHER PUBLICATIONS

Office Action dated Aug. 17, 2021 issued in corresponding JP patent application No. 2018-065643 (and English translation).

* cited by examiner

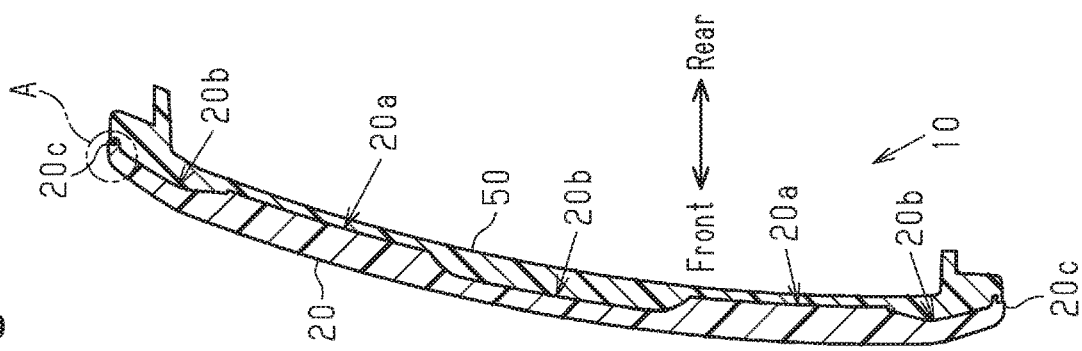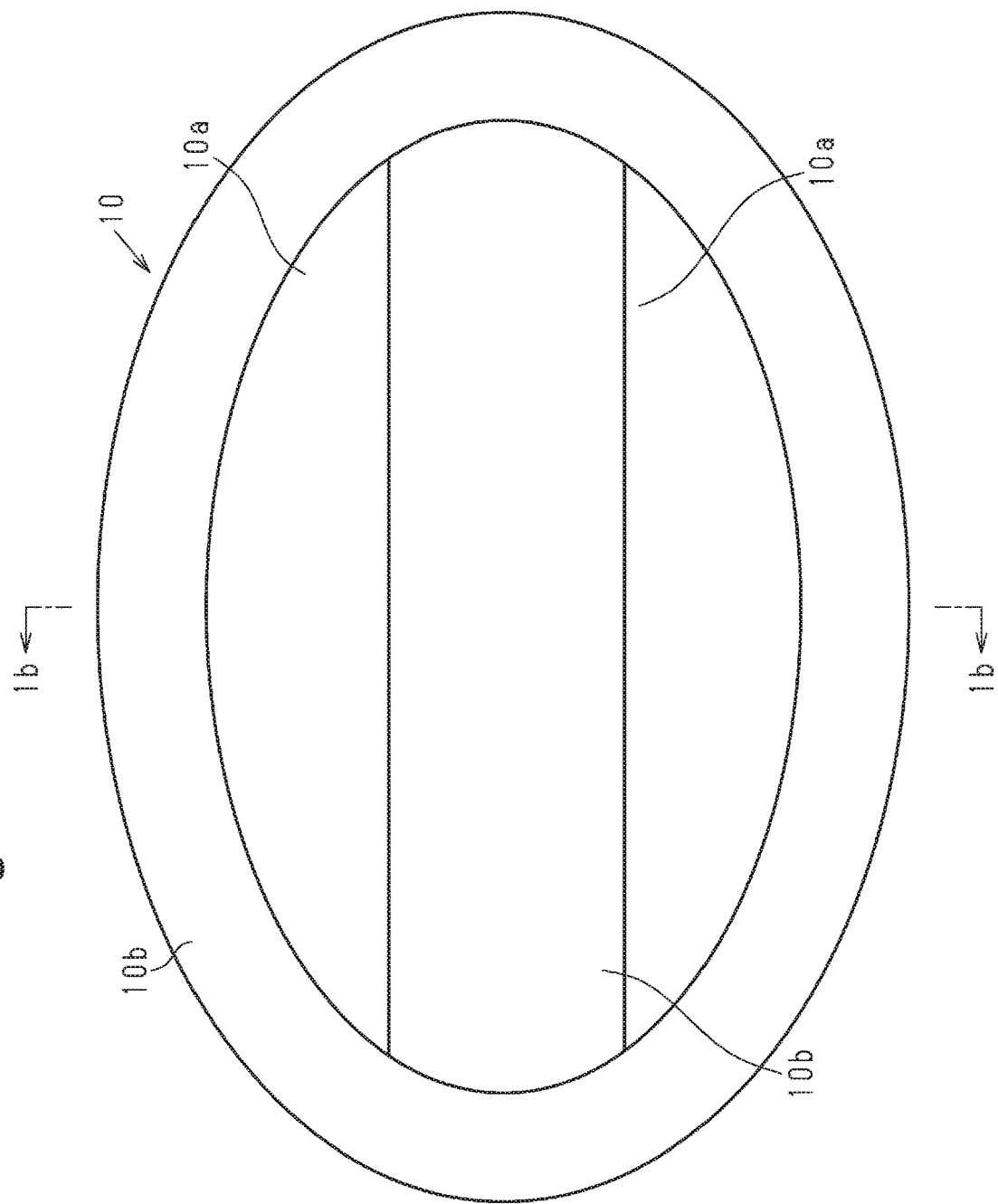

RADIO-WAVE TRANSPARENT COVER

BACKGROUND

1. Field

The following description relates to a radio-wave transparent cover disposed in a radio path of a radar system typically mounted to a car.

2. Description of Related Art

Japanese Patent Application Laid-open No. 2009-18790 (hereinafter "JP 2009-18790 A") discloses a typical radio-wave transparent cover. The radio-wave transparent cover includes a transparent layer made of plastic, a decorative layer disposed on the rear-side surface of the transparent layer, and a base layer made of plastic and disposed on the rear-side surface of the decorative layer. The transparent layer is formed from an acrylic resin or a polycarbonate by injection molding. The decorative layer is formed by metal deposition or screen printing. The base layer is formed from an acrylonitrile ethylene styrene copolymer (AES) by injection molding.

A radio-wave transparent cover is typically produced by the following steps: forming a transparent layer by injection molding; forming a decorative layer on the rear-side surface of the transparent layer; inserting the transparent layer with the decorative layer formed thereon in a mold; and injecting molten resin into the cavity of the mold to form a base layer.

The base layer contracts as it cools down, pulling the decorative layer, which sometimes results in wrinkles in the decorative layer.

As a countermeasure, the transparent layer of the radio-wave transparent cover of JP 2009-18790 A is provided with an engaging protrusion along the periphery of the rear-side surface. The protrusion extends rearward and has an edge directed radially outward to engage the base layer. With the base layer being engaged with the protrusion on the rear-side surface of the transparent layer, the thermal contraction of the base layer is suppressed, thereby the wrinkle formation in the decorative layer is prevented. However, no decorative layer is provided in an about 4 mm wide region between the engaging protrusion and the periphery of the rear-side surface of the transparent layer.

SUMMARY

It is an object of the present disclosure to provide a radio-wave transparent cover having an improved aesthetic appearance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a radio-wave transparent cover is configured to be disposed in a radio path of a radar system. The radio-wave transparent cover comprises a plastic transparent layer, a decorative layer disposed on a rear-side surface of the transparent layer, and a plastic base layer disposed on a rear-side surface of the decorative layer. The transparent layer has a peripheral part having a protrusion extending rearward. The protrusion defines a peripheral edge of the transparent layer. The protrusion has an inner circumferential surface forming a part of an engaging end projecting rearward from the protrusion. The decorative layer is provided in a region of the rear-side surface of the transparent layer adjoining the inner circumferential surface of the engaging end.

Other features and aspects will be apparent from the following detailed description, the drawings, and the claims.

BRIEF DESCRIPTION OF THE DRAWINGS

FIG. 1A is a front view of a radio-wave transparent cover according to an embodiment.

FIG. 1B is a cross-sectional view along the line 1b-1b in FIG. 1A.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 2:
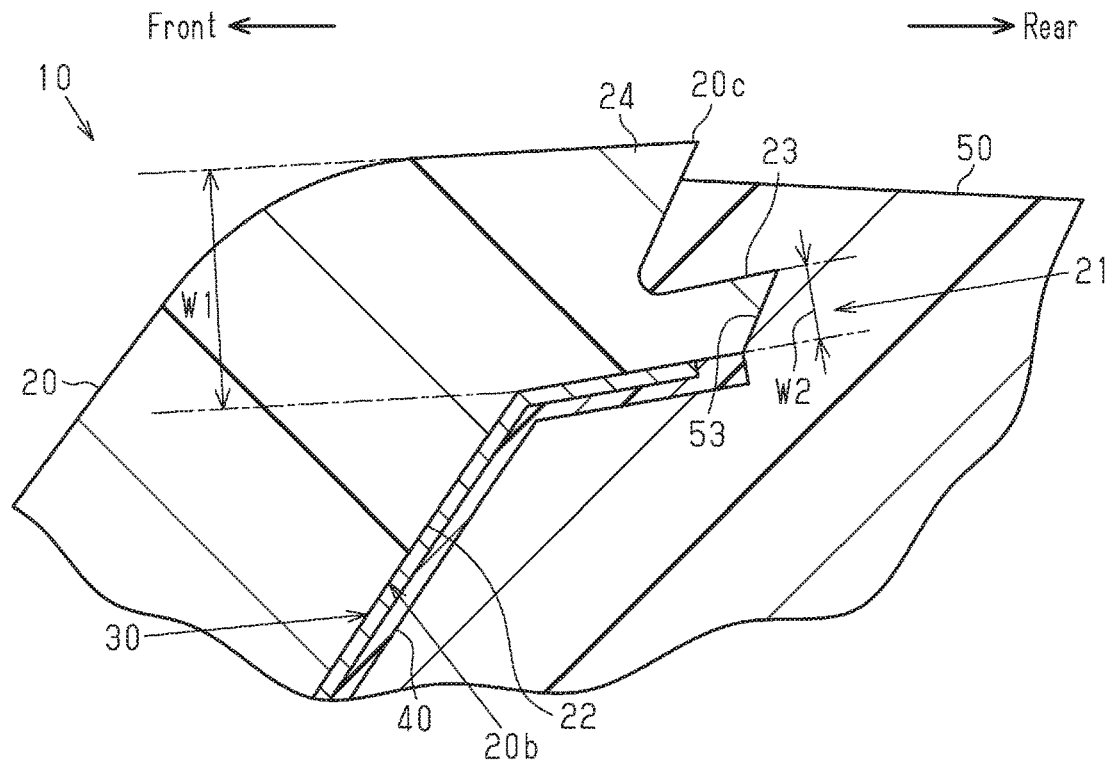
FIG. 2 is an enlarged view of the encircled part A in FIG. 1B.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

As described above, in the conventional radio-wave transparent cover disclosed in JP 2009-18790 A, the decorative layer is not disposed in an about 4 mm wide region between the engaging protrusion and the periphery of the rear-side surface of the transparent layer. The lack of the decorative layer in the peripheral region results in an undesirable black frame-like appearance of the underlying base layer showing through the transparent layer.

In order to improve aesthetic appearance, it would be desirable to provide the decorative layer closer to the peripheral edge of the radio-wave transparent cover than in the conventional radio-wave transparent cover disclosed in JP 2009-18790 A.

In embodiments, the radio-wave transparent cover includes a transparent layer made of plastic, a decorative layer disposed on a rear-side surface of the transparent layer, and a base layer made of plastic and disposed on a rear-side surface of the decorative layer. The transparent layer has a peripheral part having a protrusion extending rearward. The protrusion defines a peripheral edge of the transparent layer. The protrusion has an inner circumferential surface forming a part of an engaging end projecting rearward from the protrusion. The decorative layer is provided in a region of the rear-side surface of the transparent layer adjoining the inner circumferential surface of the engaging end.

In embodiments, the decorative layer may extend over the inner circumferential surface of the engaging end and the region of the rear-side surface of the transparent layer adjoining the inner circumferential surface of the engaging end.

In embodiments, the engaging end may include a distal end portion bent radially outwardly or radially inwardly.

In embodiments, the protrusion may have a wall thickness in a range of 1.5 to 2.5 mm.

In embodiments, the engaging end may have a wall thickness in a range of 0.4 to 1.0 mm.

Hereinafter, an illustrative embodiment of a radio-wave transparent cover will be described with reference to FIGS. 1 and 2.

As shown in FIGS. 1A and 1B, the radio-wave transparent cover (hereinafter, "cover 10") is of an oblong, elliptical shape. The cover 10 may be, for example, as an emblem. The cover 10 may be attached to an opening of a front grill of a vehicle. As used herein, the terms "front side" and "rear side" respectively correspond to the front side and the rear side of a vehicle.

The cover 10 is disposed forward of a radar system mounted to a vehicle and in a path of radio waves (millimeter waves) emitted/received by the radar system.

The cover 10 has radio-wave transparency and allows millimeter waves to pass through. As shown in FIGS. 1B and 2, the cover 10 includes a transparent layer 20, a decorative layer 30 on the rear-side surface of the transparent layer 20, a protective layer 40 on the rear-side surface of the decorative layer 30, and a base layer 50 on the rear-side surface of the protective layer 40.

The transparent layer 20 may be made of a polycarbonate, for example. The front-side surface of the transparent layer 20 is curved rearward near the peripheral edge 20c.

As shown in FIG. 1B, the rear-side surface of the transparent layer 20 has general parts 20a and recessed parts 20b recessed forward from the general parts 20a. The recessed parts 20b may have a depth of about 3.0 mm, for example.

A colored layer (not shown) such as a black layer may be provided by printing on the general parts 20a.

As shown in FIG. 2, the decorative layer 30 is provided on the entire inner surface of the recessed parts 20b. The decorative layer 30 may be made of a metal having radio-wave transparency such as indium.

As shown in FIGS. 1A and 1B, the general parts 20a (colored layers) correspond to background regions 10a of the cover 10, and the recessed parts 20b (decorative layers 30) correspond to photoluminescent regions 10b of the cover 10.

As shown in FIG. 2, a protrusion 24 extending rearward and defining a peripheral edge 20c of the transparent layer 20 is provided in a peripheral part 21 on the rear-side surface of the transparent layer 20.

The protrusion 24 further has an inner circumferential surface forming a part of an engaging end 23 projecting rearward from the protrusion 24. The engaging end 23 is provided circumferentially continuously around the cover 10 and inclines radially outwardly.

The recessed part 20b located inwardly adjacent the engaging end 23 has an inclined surface 22. The inclined surface 22 is inclined forward when viewed radially inward. The inclined surface 22 is adjoining the inner circumferential surface of the engaging end 23.

The decorative layer 30 extends over the inner circumferential surface of the engaging end 23 and the inclined surface 22.

The engaging end 23 may have a wall thickness W2 of 0.4 to 1.0 mm. More specifically, the engaging end 23 may have a wall thickness W2 of 0.5 to 0.8 mm. In an illustrative embodiment, the engaging end 23 has a wall thickness W2 of 0.6 mm.

The protrusion 24 may have a wall thickness W1 of 1.5 to 2.5 mm. More specifically, the protrusion 24 may have a wall thickness W1 of 1.8 to 2.2 mm. In an illustrative embodiment, the protrusion 24 has a wall thickness W1 of 2.0 mm.

The protective layer 40 may be formed from, e.g., a heat-resistant black paint and provided on the entire rear-side surface of the decorative layer 30. The protective layer 40 may have a thickness of several tens of micrometers. The protective layer 40 protects the decorative layer 30 from the heat during insert-molding of the base layer 50 as will be described further herein.

The base layer 50 may be formed of a black AES resin. The base layer 50 is provided to cover the protective layer 40 and parts of the transparent layer 20 not provided with the protective layer 40. The base layer 50 includes an engaging recess 53 that mates with the engaging end 23 of the transparent layer 20.

The embodiment described above may provide the following advantages.

(1) The cover 10 includes the transparent layer 20, the decorative layer 30 disposed on the rear-side surface of the transparent layer 20, and the base layer 50 disposed on the rear-side surface of the decorative layer 30. The transparent layer 20 has the peripheral part 21 having the protrusion 24 extending rearward. The protrusion 24 defines the peripheral edge 20c of the transparent layer 20. The protrusion 24 further includes the inner circumferential surface forming a part of the engaging end 23 projecting rearward from the protrusion 24. The decorative layer 30 is provided in a region of the rear-side surface of the transparent layer 20 adjoining the inner circumferential surface of the engaging end 23.

According to the configuration, the peripheral part 21 of the transparent layer has the protrusion 24 defining the peripheral edge 20c of the transparent layer 20, and the base layer 50 is positioned behind the protrusion 24. Since the protrusion 24 extends rearward, a portion of the front-side surface of the transparent layer 20 curved toward the peripheral edge 20c will be entirely reflective. Therefore, the base layer 50 may not be visible through the protrusion 24 of the transparent layer 20.

Further, the engaging end 23 formed on the rear-side surface of the transparent layer 20 suppresses contraction of the base layer 50 as it cools during the molding of the base layer 50. Thus, wrinkling of the decorative layer 30 during thermal contraction of the base layer 50 is prevented.

This way, the aesthetic appearance of the cover 10 can be improved.

(2) The decorative layer 30 extends over the inner circumferential surface of the engaging end 23 and a region (the inclined surface 22) of the rear-side surface of the transparent layer 50 adjoining the inner circumferential surface of the engaging end 23.

According to the configuration, the decorative layer 30 is provided more closely to the peripheral edge 20c of the transparent layer 20, so that the aesthetic appearance of the cover 10 can be further improved. As the engaging end 23 inclines radially outwardly, the decorative 30 can be more readily provided closely to the peripheral edge 20c of the transparent layer 20.

(3) The protrusion 24 has a wall thickness W1 of 1.5 to 2.5 mm.

The wall thickness W1 of 1.5 mm or more improves the flowability of molten resin toward the outer circumferential side of the engaging end 23 during the injection molding of the base layer 50. The wall thickness W1 of 2.5 mm or less allows the decorative layer 30 to be provided more closely to the peripheral edge 20c of the transparent layer 20, so that the aesthetic appearance of the cover 10 can be further improved.

(4) The engaging end 23 has a wall thickness W2 of 0.4 to 1.0 mm.

The wall thickness W2 of 1.0 mm or less improves the flowability of molten resin toward the outer circumferential side of the engaging end 23 during the injection molding of the base layer 50. The wall thickness W2 of 0.4 mm or more increases the rigidity of the engaging end 23.

The embodiments described above may be modified as follows. The embodiments and the following modifications can be implemented in combination with each other so long as they do not conflict technically.

The transparent layer 20 may be formed from an acrylic resin. In this case, poly(methyl methacrylate) (PMMA), which has good wear resistance, is preferably used.

The wall thickness W2 of the engaging end 23 may be less than 0.4 mm or more than 1.0 mm.

The wall thickness W1 of the protrusion 24 may be less than 1.5 mm or more than 2.5 mm.

Figure 3:
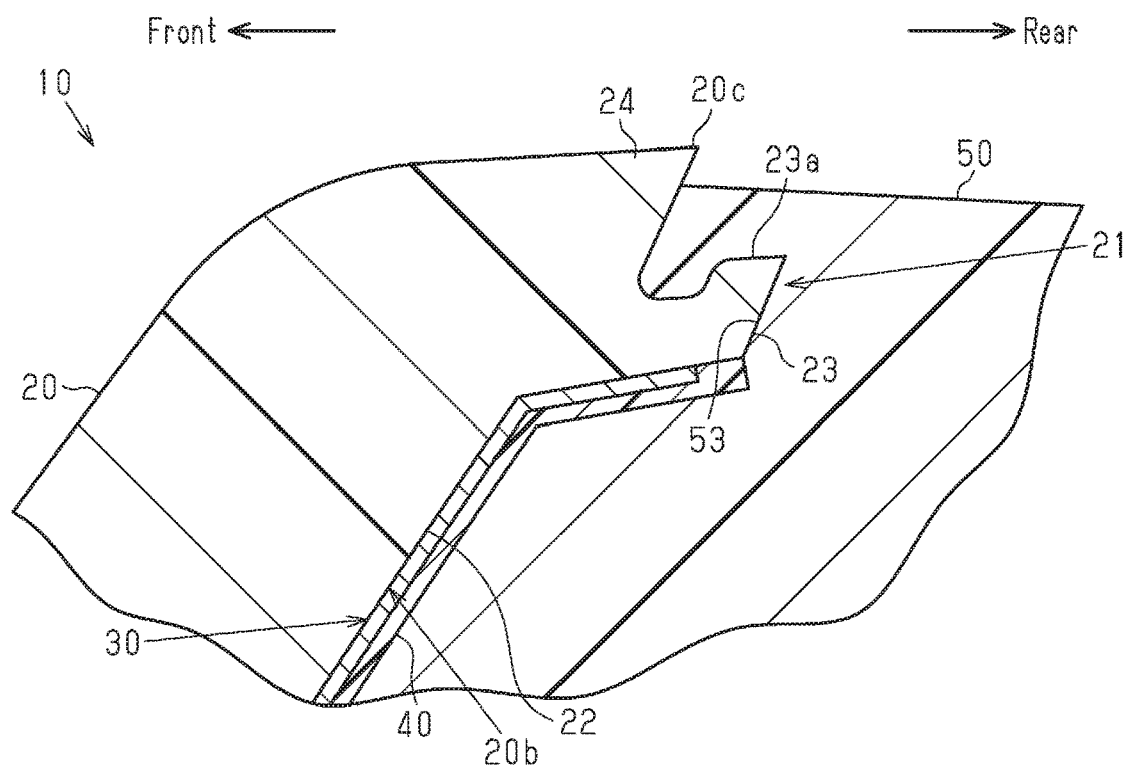
FIG. 3 is a cross-sectional view corresponding to FIG. 2 showing a radio-wave transparent cover of a modified embodiment.
Figure 4:
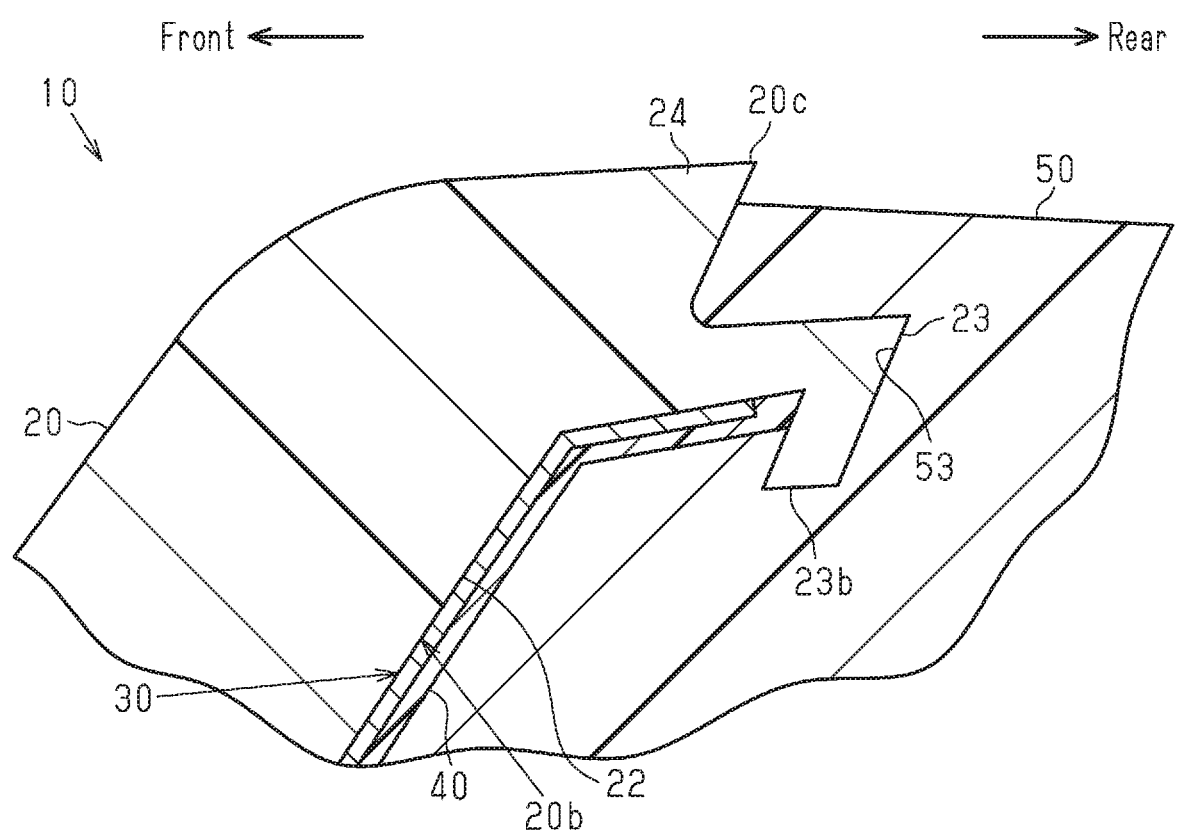
FIG. 4 is a cross-sectional view corresponding to FIG. 2 showing a radio-wave transparent cover of another modified embodiment.

As shown in FIG. 3, the engaging end 23 may further have a distal end portion 23a bent radially outwardly. Alternatively, as shown in FIG. 4, the engaging end 23 may further have a distal end portion 23b bent radially inwardly. These configurations allow the transparent layer 20 and the base layer 50 to mate with each other more firmly so that the adhesion between the transparent layer 20 and the base layer 50 can be enhanced. This in turn prevents wrinkling of the decorative layer 30 during thermal contraction of the base layer 50 more reliably.

It is not necessary that the decorative layer 30 be provided on the inner circumferential surface of the engaging end 23.

The radio-wave transparent cover of the embodiments is applicable not only as the emblem attached to the opening of front grill of a vehicle, but also as a cover attached to a part of a vehicle, such as a side part or a rear part. In this case, the front side and the rear side of the cover respectively correspond to the exterior side and the interior side of the vehicle.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A radio-wave transparent cover configured to be disposed in a radio path of a radar system, the radio-wave transparent cover comprising:
    a plastic transparent layer;
    a decorative layer disposed on a rear-side surface of the transparent layer; and
    a one-piece molded plastic base layer disposed on a rear-side surface of the decorative layer, wherein
    the transparent layer has a peripheral part having a protrusion extending rearward and defining a peripheral edge of the transparent layer,
    the protrusion has an inner circumferential surface forming a part of an engaging end projecting rearward from the protrusion, and the engaging end has a rearward facing surface that is different from the inner circumferential surface,
    the engaging end is completely surrounded by the one-piece molded plastic base layer,
    the rear-side surface of the transparent layer has a recessed part located inwardly adjacent the engaging end,
    the recessed part has an inclined surface that is inclined forward when viewed radially inward,
    the inclined surface is adjoining the inner circumferential surface of the engaging end,
    the decorative layer extends over the inner circumferential surface of the engaging end and the inclined surface,
    the decorative layer does not extend to the rearward facing surface of the engaging end, and
    the engaging end has the decorative layer only on the inner circumferential surface of the engaging end.

2. The radio-wave transparent cover according to claim 1, wherein the engaging end comprises a distal end portion bent radially outwardly or radially inwardly.

3. The radio-wave transparent cover according to claim 1, wherein the protrusion has a wall thickness in a range of 1.5 to 2.5 mm.

4. The radio-wave transparent cover according to claim 1, wherein the engaging end has a wall thickness in a range of 0.4 to 1.0 mm.

5. The radio-wave transparent cover according to claim 1, wherein the engaging end inclines radially outwardly.

6. The radio-wave transparent cover according to claim 1, wherein the decorative layer does not extend to a rearward end of the engaging end.

7. The radio-wave transparent cover according to claim 1, wherein the engaging end extends rearward of the decorative layer.

* * * * *